E. MARTIN.
PIN.
No. 33,711. Patented Nov. 12, 1861.
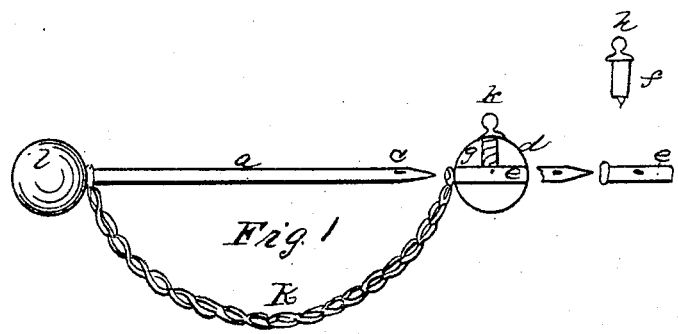
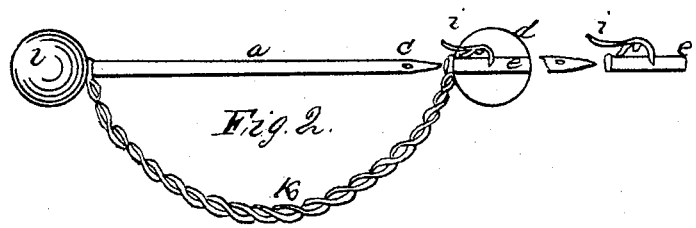
Witnesses.
E. Bishop
Inventor.

UNITED STATES PATENT OFFICE.

EMILE MARTIN, OF NEW YORK, N. Y.

SELF-FASTENING PIN.

Specification of Letters Patent No. 33,711, dated November 12, 1861.

*To all whom it may concern:*

Be it known that I, EMILE MARTIN, of the city and State of New York, have invented a new and Improved Self-Fastening Pin for Fastening Shawls, Garments, &c., and for other Uses; and I do hereby declare that the following is a full, clear, and exact description thereof and of its construction and mode or manner of operation, reference being had to the accompanying drawings, and to the letters of reference marked thereon, making a part of this specification.

The peculiarities of my improvement consist in producing a pin for fastening garments, and for other purposes, that is strong and can be easily inserted, wherever required, and that can be fastened quickly and with absolute certainty, leaving no sharp points exposed, and which can also be quickly unfastened, whenever necessary.

Figures 1, and 2, show the general construction of the pin, and two ways of arranging the catch bolt or fastening.

The pin proper $a$ is made of wire of any desired metal, and of a strength sufficient for the purpose, to one end of which is securely fastened the head $b$, and near the sharp end is an eye $c$, which may extend nearly or entirely through the pin.

The point of the pin $a$ enters into and is held in the part $d$, which may correspond in shape with the head $b$, or be formed as taste may dictate. Within such part $d$, is fixed a hollow tube $e$, of a size corresponding to the pin $a$, and into which the pointed end of the pin $a$, enters. The other end may be placed against the inner surface of the part $d$, or be closed in any way to prevent the pin $a$, from passing too far in or through it. Such tube serves both as a guide and sheath to the pointed end of the pin, and also as a support to it, preventing it from turning sidewise and loosening the fastening. Into this tube $e$ passes a spring bolt or fastening $h$ or $i$ which is so placed in position as to enter the eye of the pin, as the latter is pressed into the tube $e$. For greater strength this pin $h$ or $i$ may pass through a small tube $f$. For greater ease and certainty of fastening this pin will not extend through the tube $e$, but will be so much above it that the point of the pin will pass under it and raise it, as the pin is pushed to its place. Such bolt or fastening $h$ or $i$ is held down by the helical spring $g$, or its equivalent, so that whenever the pin is pushed to its proper position, such fastening will be made to enter the eye of the needle and hold it fast.

When it is desired to detach or remove the pin, the little knob or projection $h$ is lifted with the fingers, or by the nail, and the pin can be at once withdrawn.

The part $d$ is connected to the pin by the little chain $k$; and this, as well as the parts $b$ and $d$, may be made as tasteful and ornamental as may be preferred. They may thus be rendered appropriate ornamental fastenings for ladies' bonnets, and head dresses, or for hair ornaments and pins.

Fig. 2 shows another method of arranging the fastening or part that enters the eye of the pin.

Other methods of fastening the pin, or operating the fastening, may be made use of, so as to have the pin self-fastening; but I prefer the arrangement shown in Fig. 1.

I do not claim generally a self-fastening device for pins, rods, &c., as such devices have been used for many purposes.

What I claim as my invention and desire to secure by Letters Patent is—

A self-fastening shawl or dress pin constructed substantially as described, the pin being held firm and steady and secure by means of the guide tube $e$, and spring fastening $h$ or $i$, or equivalent combination.

E. MARTIN.

Witnesses:
   E. BISHEP,
   VICTOR MARKENS.